United States Patent [19]

Terai et al.

[11] 4,163,890

[45] Aug. 7, 1979

[54] METHOD AND APPARATUS FOR ELECTRON BEAM WELDING

[75] Inventors: Kiyohide Terai, Ashiya; Hiroyoshi Nagai, Kobe, both of Japan

[73] Assignee: Kawasaki Jukogyo Kabushiki Kaisha, Kobe, Japan

[21] Appl. No.: 835,860

[22] Filed: Sep. 23, 1977

[30] Foreign Application Priority Data

Sep. 24, 1976 [JP] Japan .................................. 51-114850
Mar. 18, 1977 [JP] Japan .................................. 52-29293

[51] Int. Cl.² .............................................. B23K 9/00
[52] U.S. Cl. ............................................ 219/121 EB
[58] Field of Search ................. 219/121 EB, 121 EN, 219/72

[56] References Cited

U.S. PATENT DOCUMENTS

3,020,387  2/1962  Basche et al. ........................... 219/72
3,020,389  2/1962  Gorman ................................... 219/72
3,440,390  4/1969  McCullough et al. ........ 219/121 EB Primary Examiner—J. V. Truhe
Assistant Examiner—Fred E. Bell
Attorney, Agent, or Firm—Fleit & Jacobson

[57] ABSTRACT

An method for electron beam welding including the step of preparing an appropriate number of vacuum chamber units. Each of the chamber units has opposite open ends and is provided with a first adaptor for accommodating an electron beam welding gun and a second adaptor for accommodating an evacuating device. The vacuum chamber units are connected in series to form one longer chamber. Workpieces to be welded to each other are put into the longer chamber. Then, the longer chamber is closed at the opposite outermost open ends by end closure members, and thereafter, electron beam welding is performed.

3 Claims, 17 Drawing Figures

METHOD AND APPARATUS FOR ELECTRON BEAM WELDING

The present invention relates to electron beam weldings and more particularly to method and apparatus for performing electron beam weldings. More specifically, the present invention relates to method and apparatus for electron beam welding which have versatility for accommodating various sizes of workpieces.

Electron beam welding has been known as being advantageous in respect of welding speed and accuracy. Particularly, it has been under focus of attention in respect of the fact that it is extremely useful for welding of thick materials. However, since such electron beam welding process must in its nature be performed under vacuum, the apparatus for the process must include a vacuum chamber which should be of substantial volume for enabling welding of materials of large dimension. Conventionally, difficulties have been encountered in that a vacuum chamber of large volume requires a substantial cost for manufacture as well as an increased time for evacuation and must be accompanied with a high capacity evacuating facility which further increases the welding cost.

Recently, there are occasions wherein the electron beam welding is applied for connecting pipes having diameters as large as 10 metres and lengths as long as several tens meters. However, evacuating chambers for such extremely large workpieces are considered as economically unjustifiable in respect of production, operation and maintenance.

The present invention has therefore an object to provide method and apparatus for electron beam welding in which the volume of vacuum chamber can be varied as desired in accordance with the dimensions of workpieces.

Another object of the present invention is to provide a vacuum chamber for electron beam welding of which volume can be changed in accordance with the dimensions of workpieces.

A further object of the present invention is to provide an apparatus for electron beam welding which has a vacuum chamber constituted by a plurality of interconnected chamber units.

Still further object of the present invention is to provide method and apparatus for electron beam welding in which workpieces can be readily handled.

According to the present invention, the above and other objects can be accomplished by an apparatus for electron beam welding which includes vacuum chamber means comprising a primary chamber unit having at least one open end and provided with adaptor means for accommodating electron beam welding gun means and second adaptor means for accommodating evacuating means, at least one auxiliary chamber unit having opposite open ends, one of said open ends of the auxiliary chamber unit being adapted to be connected to the open end of the primary chamber unit to form a single chamber, and closure means for closing the other end of the auxiliary chamber unit. The auxiliary chamber unit may also be provided with either or both of the means for accommodating electron beam welding means and the means for accommodating the evacuating means. Where two or more auxiliary chamber units are provided, one of such units is connected at one of open ends to the open end of the primary chamber unit and at the other end to one open end of another auxiliary chamber unit. The outermost open end of the outermost auxiliary unit is closed by the closure means. Where the primary chamber unit has opposed open ends, it may be of the same construction as the auxiliary chamber unit and one of the open ends may be closed by closure means.

The apparatus in accordance with the present invention may further include means for transporting the chamber units from the storing position to the loading position where the chamber units are loaded with workpieces. In order that the welding line of the workpieces can be readily aligned with the location of the electron beam welding means such as an electron beam welding gun, the chamber units may be provided with means for carrying the workpieces in axial direction thereof. Further, there may be provided means for rotating the workpieces about their longitudinal axes.

According to the present invention, there is also provided a method for performing electron beam welding. In one aspect of such method, more than two workpieces are sequentially welded together in longitudinally aligned positions. First two of the workpieces may be welded in the primary chamber unit and thereafter an auxiliary chamber unit is connected to the primary unit. Then, a further workpiece is loaded and welding is performed after closing and evacuating the chamber. In transporting the chamber unit, lift carriage means may be used in such a manner that the carriage means is placed beneath the chamber unit and then jack means on the carriage means is actuated to lift the unit from the floor so that it can be freely moved by the carriage means. In the loading station, the chamber unit may further be lifted from the carriage means and turned to a direction in which a workpiece is transported into the chamber unit.

The above and other objects and features of the present invention will become apparent from the following descriptions of preferred embodiments taking reference to the accompanying drawings, in which:

Figure 1:
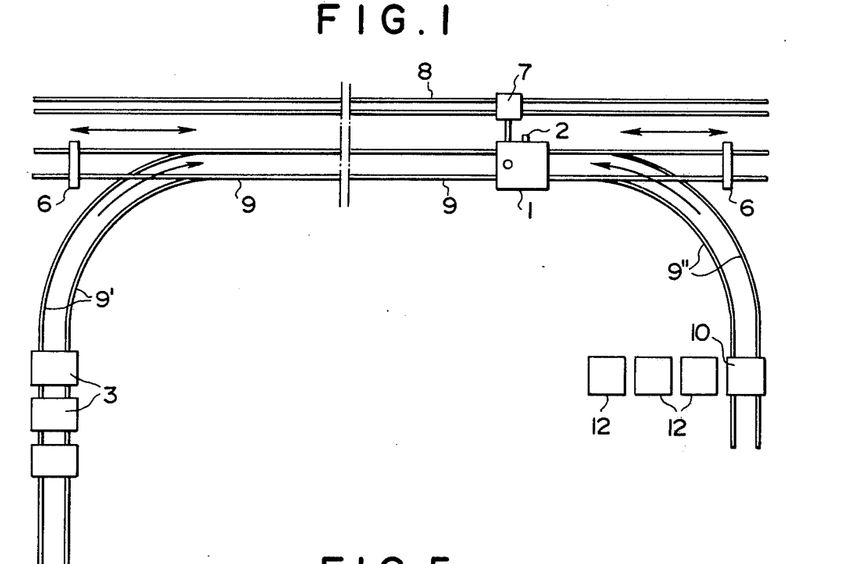
FIG. 1 is a plan view generally showing the electron beam welding apparatus in accordance with one embodiment of the present invention.
Figures 2, 3:
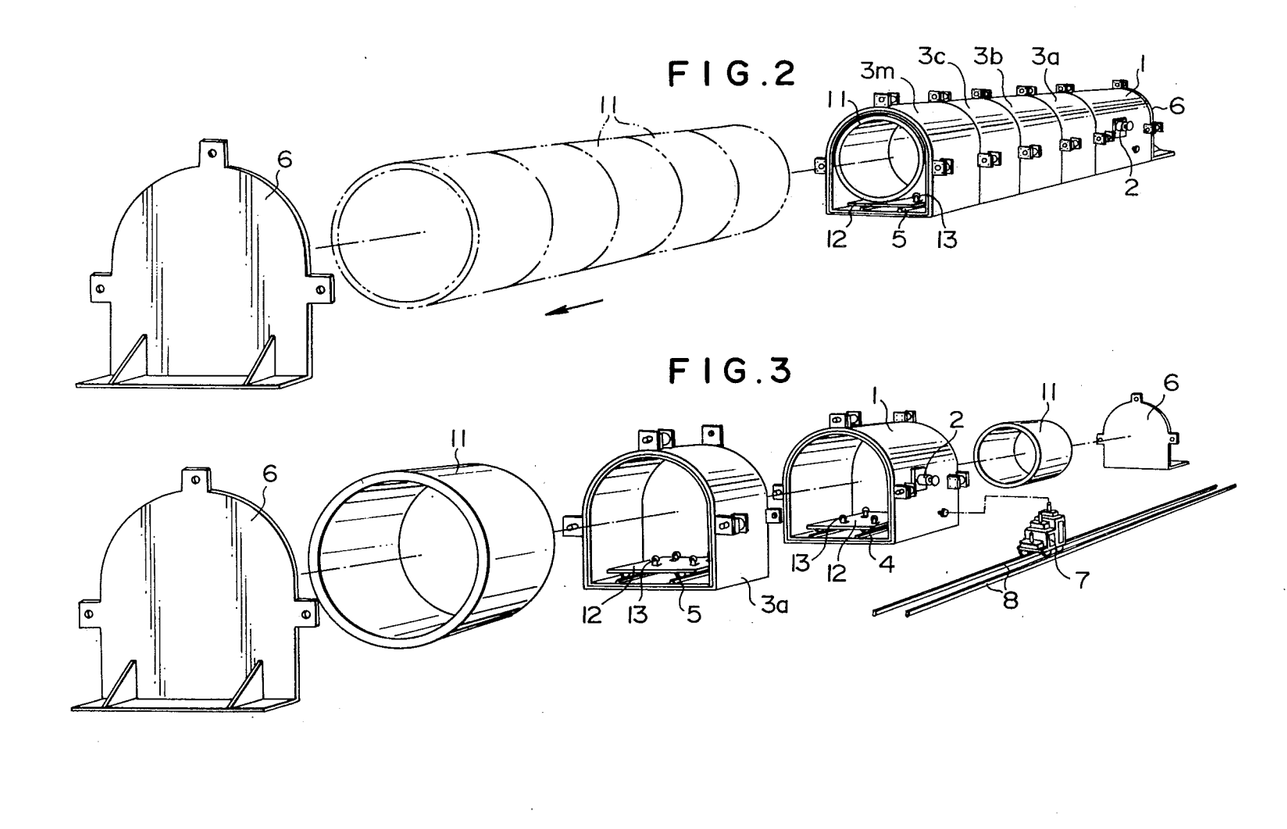
FIG. 2 is a perspective view showing an embodiment of the vacuum chamber in accordance with the present invention.
FIG. 3 is a perspective view showing a manner of connecting vacuum chamber units.

Referring now to the drawings, particularly to FIGS. 1 through 3, the electron beam welding system shown therein includes a primary vacuum chamber unit 1 having opposite open ends and provided with an electron beam welding gun 2 mounted thereon. One of the open ends of the primary chamber unit 1 is closed by means of an end closure 6. Attached to the other open end of the unit 1 is an auxiliary vacuum unit 3a which may be of the same construction as the primary unit 1. Further, a desired number of auxiliary vacuum unit 3b, 3c . . . 3m may be connected in series as shown in FIG. 2.

The chamber units 1 and 3 have at their bottoms axially aligned paired rails 4 and 5 on which a carriage 12 may be passed. The outer end of the auxiliary unit 3m is closed by an end closure 6.

Referring specifically to FIG. 1, a pair of straight rails 9 are provided to guide the chamber unit 1 therealong. The end closures 6 are also placed on the rails 9 to run thereon. The rails 9 are provided with branch rails 9' and 9". Desired number of auxiliary chamber units 3 are provided on the branch rails 9' and adapted to be carried to the rails 9 when desired. On the branch rails 9", there are provided a plurality of carriages 12 so that they can be transported to the rails 9 whenever desired with workpieces 11 mounted thereon. A pair of rails 8 are provided in parallel with the rails 9 so that an evacuating pump 7 can be moved therealong.

As shown in FIG. 3, each carriage 12 is provided with paired rollers 13 for supporting the workpiece 11. The workpiece 11 can thus be rotated about its longitudinal axis for continuously exposing the welding line to the electron beam from the gun 2. In the drawings, the auxiliary vacuum chamber units 3 are not equipped with welding guns, however, they may have such guns where desired.

Figure 4:
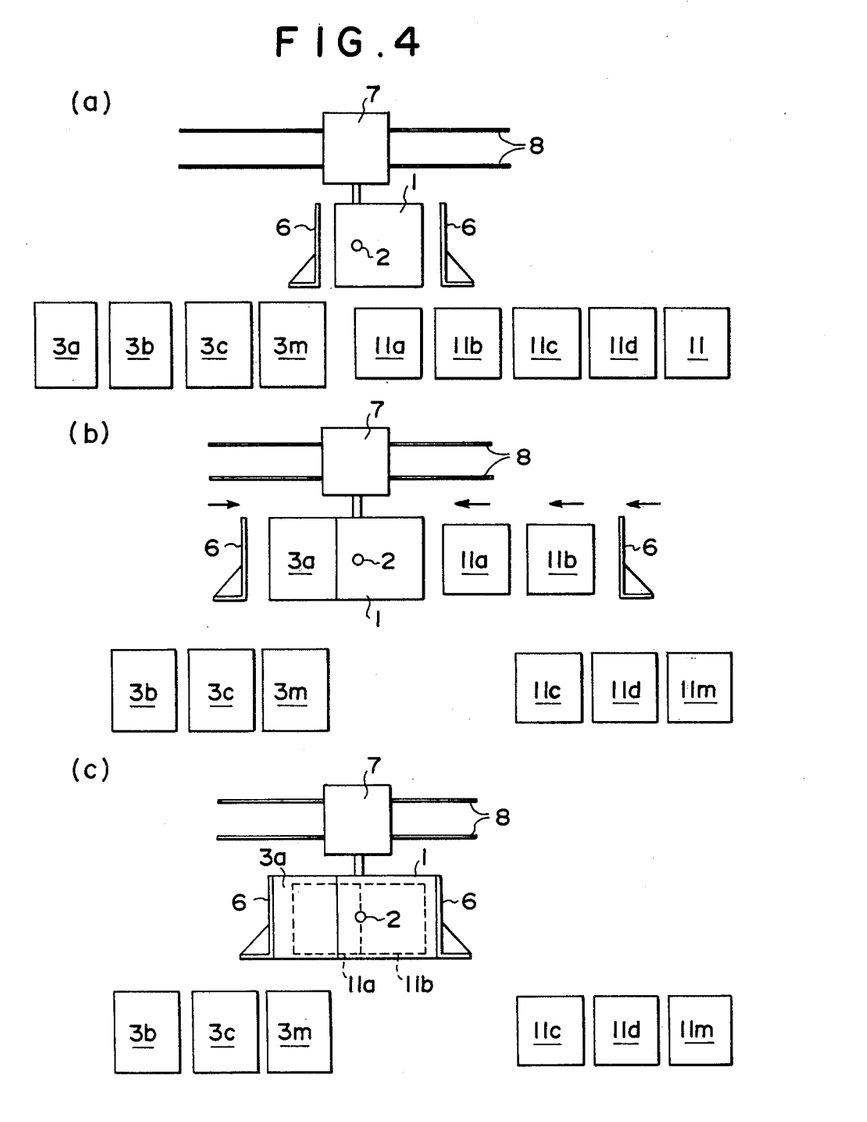
FIGS. 4(a) through (f) show an example of the welding process in accordance with the present invention.

Referring now to FIGS. 4(a) through (f), there is shown an example of welding process in accordance with the present invention. The primary chamber unit 1 is at first placed on the rails 9 and when desired an auxiliary chamber unit 3a is gas-tightly connected thereto as shown in FIG. 4(b). The workpieces 11a and 11b are then carried into the vacuum chamber thus prepared and the end closures 6 are vacuum-tightly secured to the opposite ends of the chamber as shown in FIG. 4(c). The evacuating pump 7 is then operated to apply vacuum to the chamber and the welding operation is performed by means of the gun 2.

The end closures 6 are then removed and another auxiliary chamber unit 3b is connected to the unit 3a. A further workpiece 11c is carried into the vacuum chamber thus prepared and the end closures 6 are attached to vacuum-tightly close the opposite ends of the vacuum chamber as shown in FIGS. 4(d) and (e). The second welding operation is then performed and the end closures 6 are thereafter removed as shown in FIG. 4(f). Thus, the same procedures are repeated.

Figure 5:
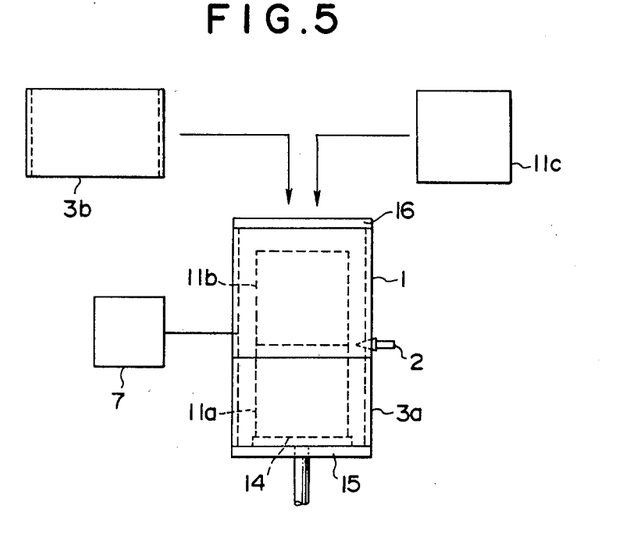
FIG. 5 is a diagrammatical view showing another example of the welding process in accordance with the present invention.

FIG. 5 shows another embodiment of the present invention in which the primary and auxiliary chamber units 1 and 3a are arranged in vertically aligned relationship. The chamber unit 3a has an open lower end which is closed by a bottom closure 15 having a rotating table 14 mounted thereon. Workpieces 11a, 11b, 11c may be carried into the vacuum chamber by means of a crane or the like. The rotating table 14 may be equipped with lifting means so that the workpieces can be vertically adjusted to have the welding line aligned with the welding gun 2. Thereafter, a top closure 16 is attached to the vacuum chamber and the evacuating pump 7 is actuated.

After the completion of the welding, the top closure 16 is removed and the primary chamber unit 1 is lifted. Then, a second auxiliary chamber unit 3b is connected to the unit 3a and the primary unit 1 is connected to the unit 3b to complete a vacuum chamber of larger size. Similar operations are then repeated to perform a further welding.

Figure 6:
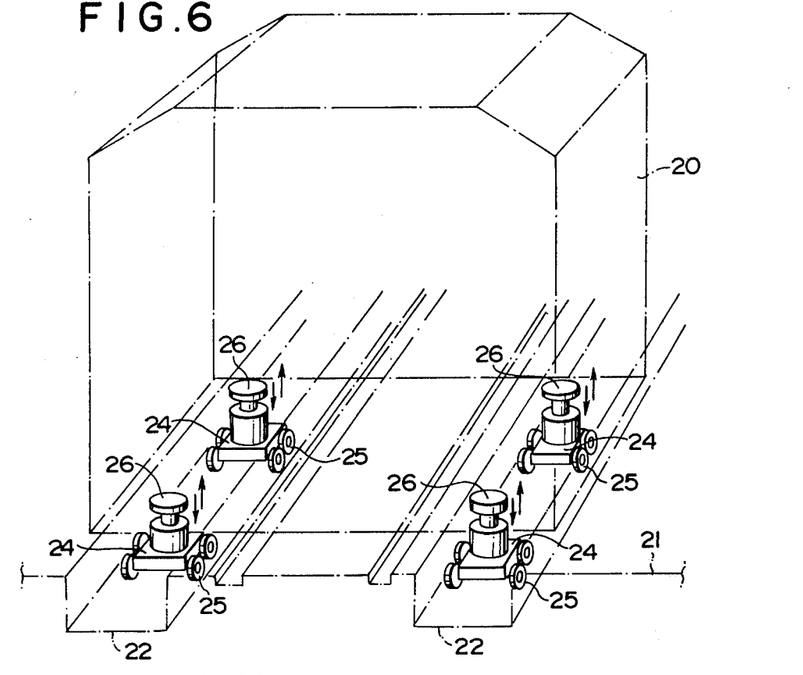
FIG. 6 is a perspective view showing carriages to be used for transporting the vacuum chamber unit.

Referring to FIG. 6, there is shown an example of the mechanism for transferring a vacuum chamber unit which is designated by the reference numeral 20. The base floor 21 is provided with paired guide grooves 22 which correspond to the rails 9 in the previous embodiment. Carrier trucks 24 having wheels 25 are disposed in the grooves 22 to run therealong. Each of the trucks 24 has a lifting device 26 which may be operated by hydraulic or pneumatic power. In the lowered position of the lifting devices 26, the trucks 24 release the chamber unit 20 so as to allow it to seat on the base floor 21. When the lifting devices 24 are actuated to lift the chamber unit 20, however, the unit 20 is transported by the trucks 24 along the guide grooves 22.

Figure 9:
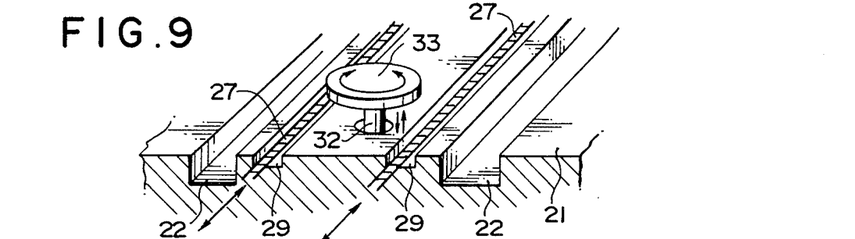
FIG. 9 is a perspective view particularly showing the ground facilities.
Figures 14, 15, 16:
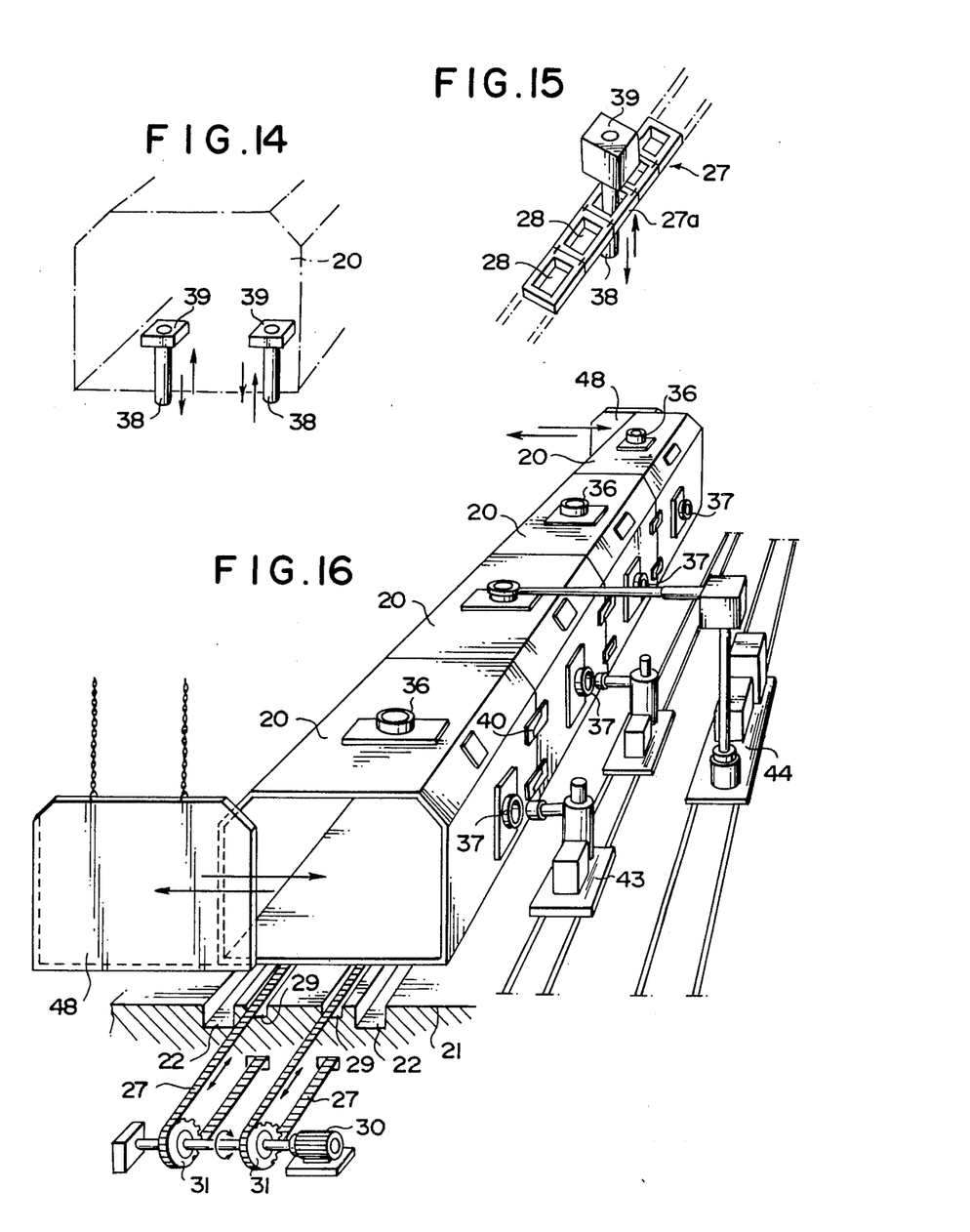
FIGS. 14 and 15 show a mechanism for driving the vacuum chamber unit.
FIG. 16 is a perspective view showing interconnected vacuum chamber units.

Along the guide grooves 22, there are provided a further pair of grooves 29 in which endless conveyor chains 27 are arranged as shown in FIGS. 9 and 16. It will be seen in FIG. 16, the endless chains 27 pass around sprockets 31 which are driven by a motor 30. Although not shown in the drawings, the endless chains 27 further pass around idler sprockets. As shown in FIG. 15, the chain 27 has a series of openings 28 formed in the chain elements 27a. The chamber unit 20 is provided with a pair of hydraulic actuators 39 having downwardly extending rods 38 which are adapted to engage when extended the openings 28 in the chains 27 so that the chamber unit 20 is transported by the chains 27.

Figure 7:
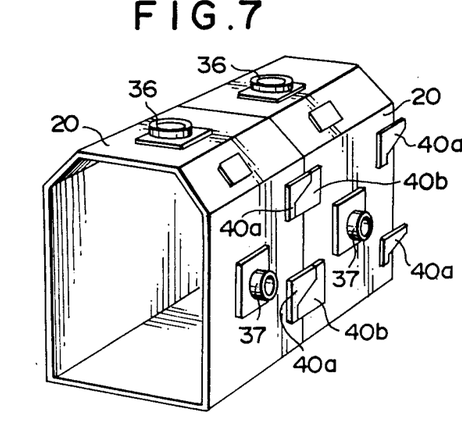
FIG. 7 is a perspective view of two interconnected chamber units.

FIG. 7 shows a further example of the vacuum chamber units which may be used with the ground equipment described above. Each of the chamber units which is designated by the reference numeral 20 has an adapter 36 for connecting the evacuating device at the top surface thereof. Further, the chamber unit 20 is also provided with an adapter 37 for an electron beam welding gun.

Figure 8:
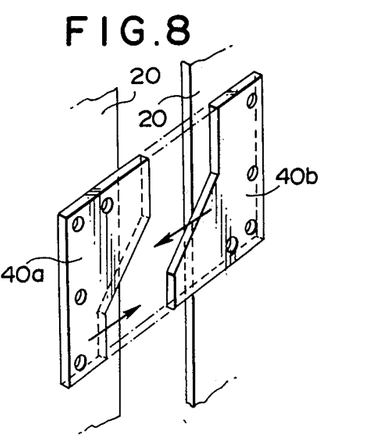
FIG. 8 is a perspective view showing the self-centering mechanism employed in the chamber units.

At the opposite ends of the vacuum chamber unit 20, there are provided complementary self-centering elements 40a and 40b which are removably attached to the unit 20. As shown in FIG. 8, the elements 40a on one unit 20 are brought into engagement with the elements 40b one the adjacent unit 20 when these two units are to be connected so that the units are automatically aligned each other thanks to the slanted cam surfaces on the elements. The self-centering elements are removed from the outer ends of the outermost ones in the series of mutually connected chamber units 20 for facilitating attachment of end closures as described later.

Figure 10:
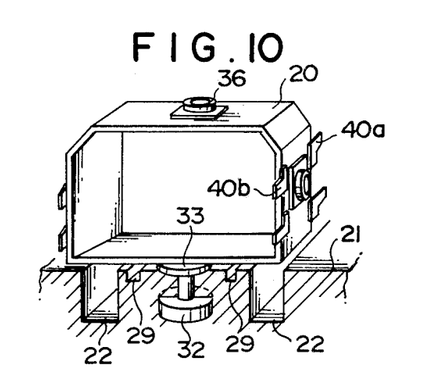
FIGS. 10 through 13 show the process for loading a workpiece to the chamber unit.
Figure 11:
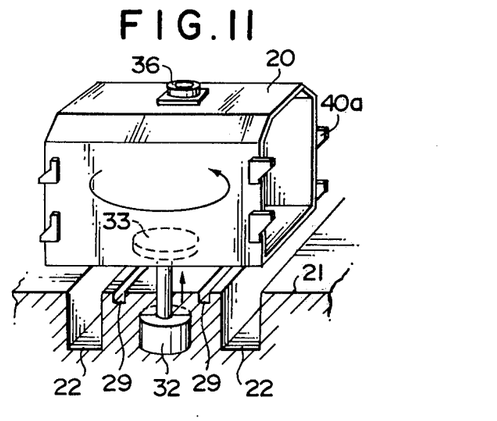
Figure 12:
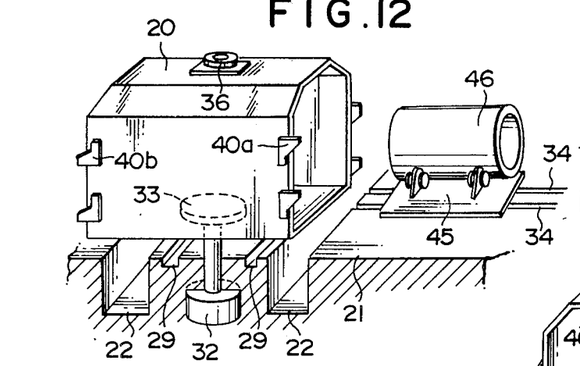
Figure 13:
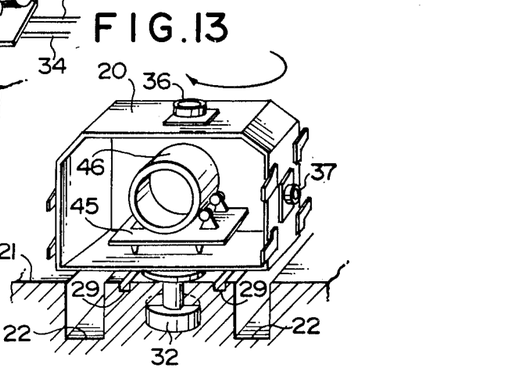

On the base floor 21, there is provided between the grooves 29 a turn-table 33 which can be vertically moved as shown by arrows in FIG. 9 by means of a hydraulic jack 32. Thus, the chamber unit 20 is at first moved to the station above the turntable 33 as shown in FIG. 10 and then lifted by the jack 32. Thereafter, it is turned by the turn-table 33 as shown in FIG. 11. In this situation, a workpiece 46 is carried by a carriage 45 along transverse grooves 34 into the chamber unit 20 (FIG. 12). The chamber unit 20 thus loaded with the workpiece 46 is turned as shown by an arrow in FIG. 13 to assume the original orientation and then moved along the grooves 22 to the position shown in FIG. 17(a).

Figure 17:
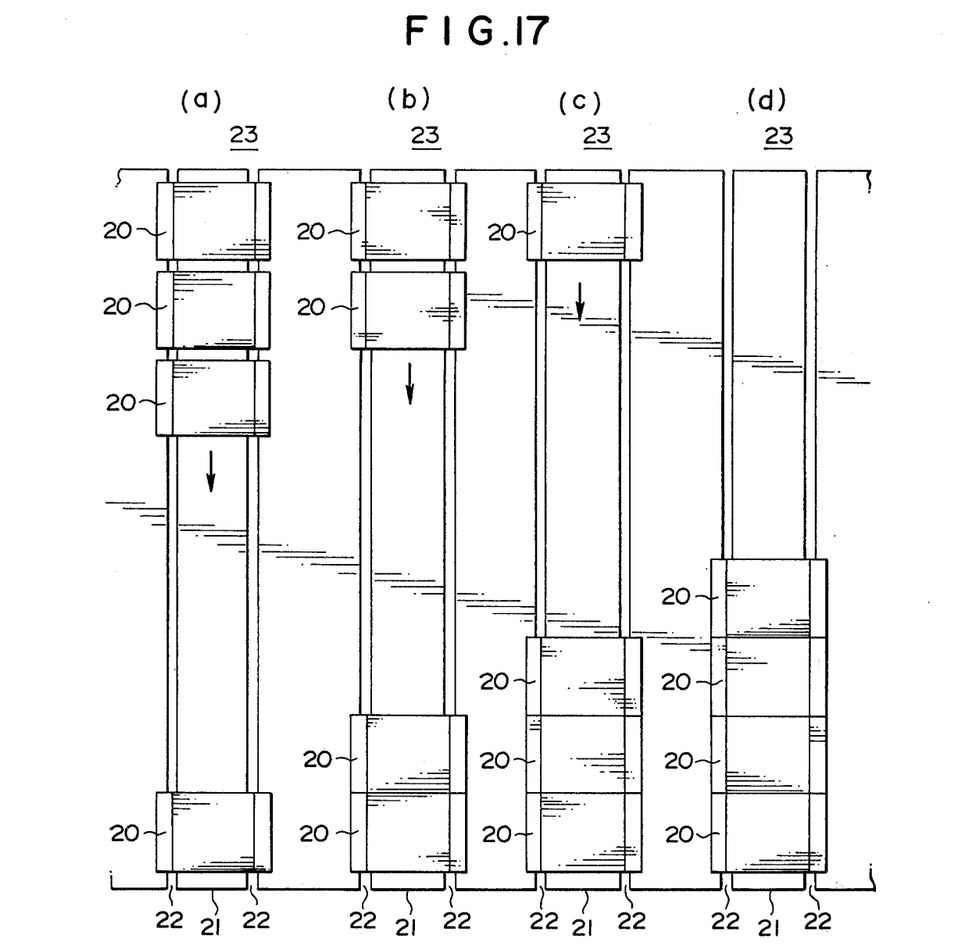
FIGS. 17(a) through (d) show the manner of sequentially interconnecting the vacuum chamber units.

A second chamber unit 20 is then moved to the loading station and loaded with a second workpiece, after when the unit 20 is moved to the position shown in FIG. 17(b) and vacuum-tightly connected with the first unit. Similarly, a third and fourth chamber units 20 are moved to the positions shown in FIGS. 17(c) and (d) and vacuum-tightly connected to the preceding units. End closures 48 are then transversely carried by means of crane or the like and close the endmost openings of the mutually connected chamber units 20. For the purpose, at the opposite ends of the train of the chamber units 20, the self-centering elements 40a and 40b are removed in advance.

Thereafter, an evacuating device 44 is connected to the adaptor 36 on one of the chamber units 20 and electron beam welding guns 43 are connected to the appropriate ones of the adaptors 17 to perform welding. Of course, it is possible to perform the welding operations sequentially and, in this case, the chamber units 20 may be connected one by one as in the previous embodiment.

The invention has thus been shown and described with reference to specific arrangements, however, it should be noted that the invention is in no way limited to the details of the illustrated structures but changes and modifications may be made without departing from the scope of the appended claims.

We claim:

1. Means for electron beam welding which includes vacuum chamber means comprising a primary chamber unit having at least one open end and provided with adaptor means for accommodating electron beam welding gun means and second adaptor means for accommodating evacuating means, at least one auxiliary chamber unit having opposite open ends, one of said open ends of the auxiliary chamber unit being adapted to be connected to the open end of the primary chamber unit to form a single chamber, closure means for closing the other end of the auxiliary chamber unit, means for lifting and turning the chamber unit, and means for introducing a workpiece into the thus turned chamber unit.

2. Means for electron beam welding which includes vacuum chamber means comprising a primary chamber unit having at least one open end and provided with adaptor means for accommodating electron beam welding gun means and second adaptor means for accommodating evacuating means, at least one auxiliary chamber unit having opposite open ends, one of said open ends of the auxiliary chamber unit being adapted to be connected to the open end of the primary chamber unit to form a single chamber, closure means for closing the other end of the auxiliary chamber unit, said chamber units being provided with rail means which are axially aligned when the units are connected together so as to allow carriage means to pass therealong with a workpiece mounted thereon, wherein said carriage means includes means for rotating the workpiece mounted thereon so that a welding line is continuously exposed to the electron beam from the welding gun means.

3. Method for electron beam welding comprising steps of providing a vacuum chamber by connecting an appropriate number of chamber units putting workpieces into the chamber, closing end openings of the chamber and performing electron beam welding on the workpieces, opening one of the end openings of the chamber, connecting a further chamber unit form a chamber of a longer size, introducing a further workpiece to the longer chamber, closing open end of the longer chamber and performing electron beam welding.

* * * * *